US005543185A

United States Patent [19]

Christensen

[11] Patent Number: 5,543,185

[45] Date of Patent: Aug. 6, 1996

[54] ARTIFICIAL ROCK CLIMBING STRUCTURE AND METHOD OF MAKING

[75] Inventor: Daniel Christensen, Cupertino, Calif.

[73] Assignee: Arete Climbing Systems, Inc., Fremont, Calif.

[21] Appl. No.: 226,800

[22] Filed: Apr. 12, 1994

[51] Int. Cl.[6] .............................. B29C 67/20; B44F 9/04

[52] U.S. Cl. ................................................ 428/15; 156/61

[58] Field of Search .............................. 428/15; 434/150, 434/151, 152; 156/61

[56] References Cited

U.S. PATENT DOCUMENTS

| | | | |
|---|---|---|---|
| 2,801,936 | 8/1957 | Bjorksten et al. | 428/195 |
| 2,953,469 | 9/1960 | Fox | 428/15 X |
| 4,241,554 | 12/1980 | Infantino | 428/15 X |
| 4,331,734 | 5/1982 | Stegmeier | 428/15 X |
| 4,647,000 | 3/1987 | Osada | 428/15 X |
| 4,868,018 | 9/1989 | Schiffer | 428/15 |
| 4,960,622 | 10/1990 | Jarboe et al. | 428/15 |

*Primary Examiner*—Henry F. Epstein
*Attorney, Agent, or Firm*—Townsend and Townsend and Crew LLP

[57] ABSTRACT

A unique climbing structure that is durable, lightweight and easy to assemble is provided. The structure is based on the use of polystyrene foam blocks attached to a support structure. The polystyrene can be cut to be irregularly shaped like a normal rock, and can be shaped with larger dimensions and depth than other techniques, giving a more realistic structure. The shaped polystyrene foam is covered with a hard coating to give the exterior a rock-like appearance.

9 Claims, 2 Drawing Sheets

ARTIFICIAL ROCK CLIMBING STRUCTURE AND METHOD OF MAKING

BACKGROUND OF THE INVENTION

The present invention relates to artificial rock climbing structures.

Artificial rock climbing walls have become popular for indoor gyms, resorts, and inside mountain climbing equipment retail stores. Such walls allow climbers to practice and hone their skills, or allow beginners to experience rock climbing in a safe environment. In addition, it allows purchasers to try out rock climbing boots and other equipment in a store.

A typical climbing gym will have a wall constructed out of plywood with T-nuts inserted through the plywood panels. The T-nuts allow external pieces called "rock climbing holds" to be added and changed to vary the features and to easily change the climbing difficulty. A rock climbing hold is typically made of resin-concrete and can be shaped as desired. For instance, an easy hold would provide a large extending ledge, which is easily grabbed or stepped on. A more difficult hold will only extend out slightly, making it more difficult to grab and hold onto.

More recent climbing walls have covered the plywood panels with a mixture of sand and paint to give it a nicer look and feel. Some manufacturers use textured fiberglass panels, rather than plywood.

Other techniques for producing artificial climbing walls include bolting climbing holds onto a concrete wall, and spraying concrete onto a metal frame. In addition resin-concrete tiles can be fixed to a wooden or concrete support.

SUMMARY OF THE INVENTION

The present invention provides a unique climbing structure that is durable, lightweight and easy to assemble. The structure is based on the use of polystyrene foam blocks attached to a support structure. The polystyrene can be cut to be irregularly shaped like a normal rock, and can be shaped with larger dimensions and depth than other techniques, giving a more realistic structure. The shaped polystyrene foam is covered with a hard coating to give the exterior a rock-like appearance.

The exterior coating is preferably a base coating of fibrous material and acrylic, covered with a top coating of plaster including cement, acrylic and coloring. The polystyrene foam blocks are glued to the support structure, and can also be bolted to the support structure with wooden blocks attached to the exterior of the polystyrene foam as anchors. These wooden blocks can also be used as supports for anchoring removable climbing holds.

The present invention gives a method of making a rock climbing structure which is cost-effective, and produces a realistic structure which is light enough to be easily assembled. The polystyrene foam is surprisingly strong when incorporated into the structure of the present invention.

For a fuller understanding of the nature and advantages of the invention, reference should be made to the following description in conjunction with the attached drawings.

DESCRIPTION OF THE PREFERRED EMBODIMENT

The present invention uniquely recognizes the strength and versatility of polystyrene foam for a rock climbing structure. Preferably, the manufacturing process begins with the use of large blocks of expanded polystyrene foam (EPS foam). These blocks would typically be several feet in diameter. The block can be carved using knives, chain saws and grinders, to produce forms which replicate rocks. Additional pieces of foam can be added at different places using adhesives to extend depth and add features to the underlying foam blocks.

Figure 1:
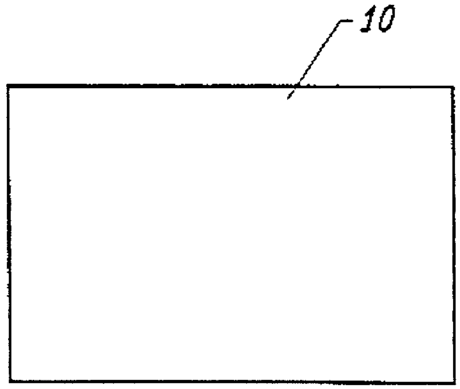
FIG. 1 is a side view of a block of polystyrene foam.
Figure 2:
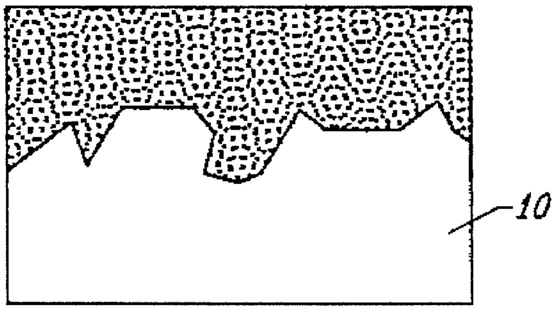
FIG. 2 is a side view of the foam block of FIG. 1 cut to the desired shape.
Figure 3:
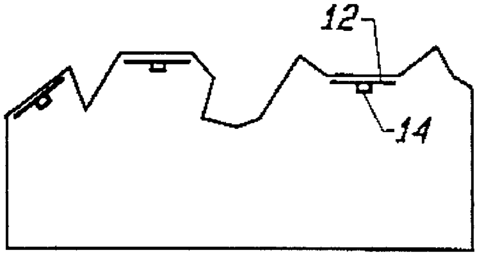
FIG. 3 shows the wooden blocks with the T-nut insert added to the foam block of FIG. 2.
Figure 4:
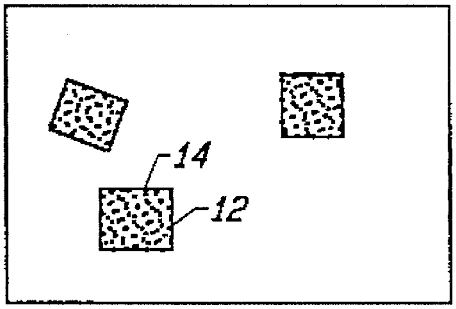
FIG. 4 is a side view of a block of FIG. 3.

FIG. 1 illustrates a starting foam block 10 used in the present invention. FIG. 2 is a side view of the block after it has been cut to give the exterior a rock-like face. The next step, as shown in FIG. 3, is the gluing onto flat portions of the foam block surface of wooden blocks 12 having T-nut inserts 14. FIG. 4 gives a top view of these blocks.

Figure 5:
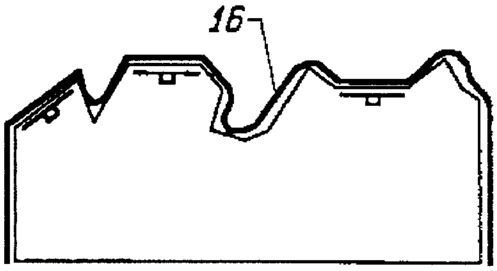
FIGS. 5–9 are successive views showing the addition of the base and top coats of the present invention.
Figure 6:
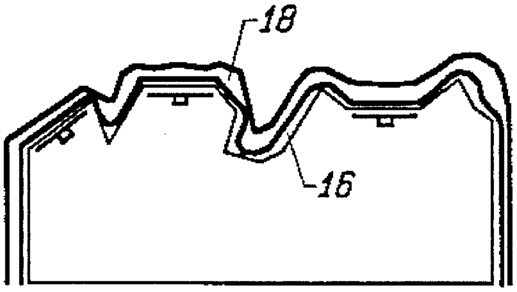

As shown in FIG. 5, a first coat of cement-like material is applied to the foam to give it strength. This first base coating is preferably a mixture of synthetic fiber strands, acrylic (liquid plastic), cement (or plaster) and water. The material is sprayed on using a hopper or plastering gun and smoothed out using sponges and water. After this first base coat 16 is applied and allowed to dry, a second base coat 18 is applied as shown in FIG. 6, using the same technique.

Figure 7:
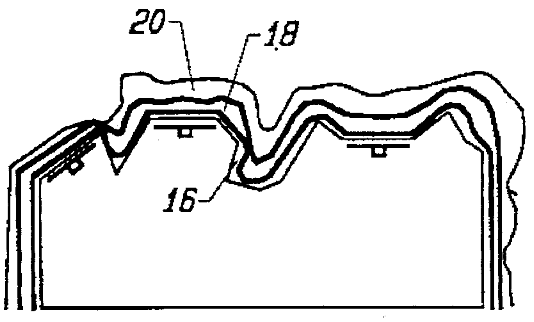
Figure 8:
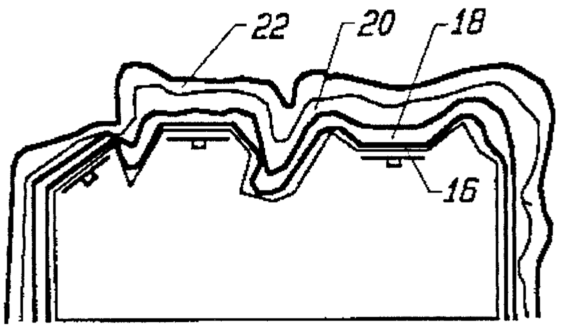

When base coat 18 has dried, a first top coat 20 is applied as shown in FIG. 7. The top coating, which will be visible to the user, is preferably a mixture of cement, water, acrylic and coloring. The coloring is added to avoid having to use paint or other materials that could wear off or change with time. By having the coloring mixed in throughout the coating, the wall can wear and still retain the coloring, giving it the feel and appearance of real rock. The top coating is also applied using a hopper gun and smoothed with sponges and water, as the base coat was. After top coat 20 is applied and dries, a second top coat 22 may optionally be applied, as shown in FIG. 8.

Figure 9:
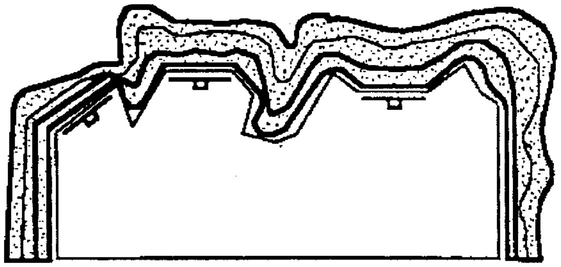
Figure 10:
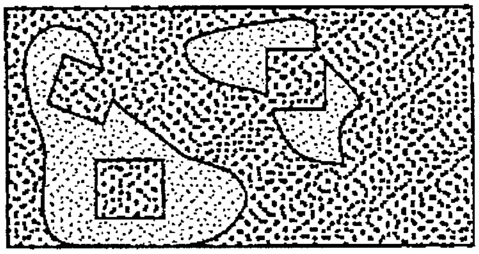
FIG. 10 is a top view of the block of FIG. 9.
Figure 11:
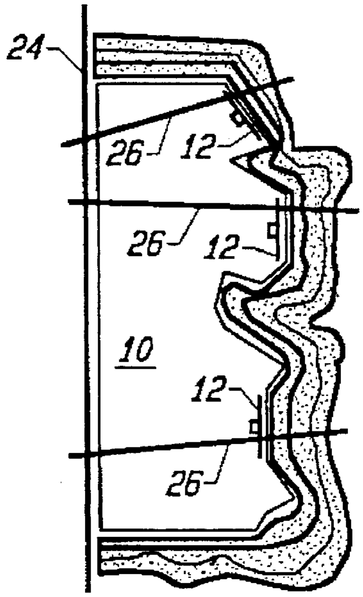
FIG. 11 is a side view of the block showing the mounting bolts.

The structure is then buffed to give a final texture structure as shown in FIG. 9, with a top view illustrated in FIG. 10. This foam block structure can then be bolted to a support structure 24, as shown in FIG. 11. A series of long bolts 26 connect between support structure 24 and wooden blocks 12 to secure the foam block 10 to the support. In addition, the foam block can be glued to the support structure. A preferred adhesive is construction mastic.

Figure 12:
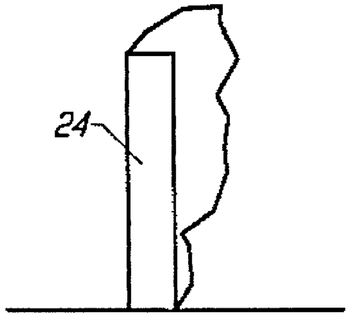
FIG. 12 is a side view of the final assembled structure.

FIG. 12 shows the final structure on the support structure or frame 24 in its vertical position. The frame 24 can be made large enough to be self-supporting, or can itself be bolted to the side of a building or other structure in a gym or otherwise.

As will be understood by those of skill in the art, the present invention may be embodied in other specific forms without departing from the spirit or essential characteristics thereof. For example, the polystyrene foam could be bolted to the support structure and mounted in position before the coatings are applied. Alternately, different mixtures could be used for the coating to give equivalent strength and rock-like appearance features. Accordingly, the disclosure of the preferred embodiment of the invention is intended to be illustrative, but not limiting, of the scope of the invention which is set forth in the following claims.

What is claimed is:

1. An artificial rock climbing structure comprising:

a support frame;

at least one block of polystyrene foam permanently attached to said support frame, said polystyrene foam having a surface opposite said support frame irregularly shaped to resemble a rock surface, said block having a sufficient size to support a person's weight; and a hard coating on said irregularly shaped surface, said hard coating resembling a rock surface.

2. The structure of claim 1 wherein said polystyrene foam is glued to said support frame.

3. The structure of claim 1 further comprising:

a plurality of wood blocks attached to said irregularly shaped surface of said polystyrene foam; and a plurality of bolts, each of said bolts connecting one of said wood blocks to said support structure.

4. The structure of claim 1 further comprising:

a plurality of wood blocks attached to said irregularly shaped surface of said polystyrene foam in recesses formed in said polystyrene foam;

a plurality of fasteners, each fastener attached to one of said wood blocks; and a plurality of removable climbing holds removably attached to said wood blocks.

5. The structure of claim 1 wherein said hard coating comprises:

a base coating of plaster, fibrous material and an acrylic; and a top coating of plaster including cement, an acrylic and coloring.

6. The structure of claim 5 wherein said fibrous material is synthetic fiber strands.

7. The structure of claim 1 wherein said polystyrene foam is expanded polystyrene foam.

8. The structure of claim 1 further comprising at least a second polystyrene foam piece bonded with an adhesive to said one block of polystyrene foam.

9. An artificial rock climbing structure comprising:

a support frame;

at least one base block of polystyrene foam permanently attached to said support frame with an adhesive, said polystyrene foam having a surface opposite said support frame at least partially irregularly shaped to resemble a rock surface, said block having a sufficient size to support a person's weight;

at least one exterior piece of polystyrene foam attached to said base block of polystyrene foam, said exterior piece having a surface opposite said base block which is irregularly shaped to resemble a rock surface;

a base coating of fibrous material and an acrylic on said irregularly shaped surfaces of said polystyrene foam blocks;

a top coating of plaster over said base coating, said top coating including cement, an acrylic and coloring;

a plurality of wood blocks attached to said irregularly shaped surfaces of said polystyrene foam blocks;

a plurality of fasteners, each fastener attached to one of said wood blocks; and a plurality of removable climbing holds removably attached to said wood blocks.

* * * * *